United States Patent
Strasser et al.

(10) Patent No.: US 7,792,609 B2
(45) Date of Patent: Sep. 7, 2010

(54) GRIPPING DEVICE FOR MANIPULATING DEVICE AND METHOD FOR OPERATION THEREOF

(75) Inventors: Hagen Strasser, Pasching (AT); Gerhard Sperrer, Oberschlierbach (AT)

(73) Assignee: Trumpf Maschinen Austria GmbH & Co. Kg., Pasching (AT)

( * ) Notice: Subject to any disclaimer, the term of this patent is extended or adjusted under 35 U.S.C. 154(b) by 1323 days.

(21) Appl. No.: 10/529,262

(22) PCT Filed: Sep. 25, 2003

(86) PCT No.: PCT/AT03/00282
§ 371 (c)(1),
(2), (4) Date: Aug. 12, 2005

(87) PCT Pub. No.: WO2004/028939
PCT Pub. Date: Apr. 8, 2004

(65) Prior Publication Data
US 2006/0184282 A1    Aug. 17, 2006

(30) Foreign Application Priority Data
Sep. 26, 2002   (AT) ............................... A 1456/2002

(51) Int. Cl.
*G05B 15/00* (2006.01)
(52) U.S. Cl. .................. 700/258; 700/83; 700/213; 700/219; 700/245; 700/254; 414/796.2; 414/796.5; 414/796.9; 414/797; 414/797.8; 271/268; 271/258.01; 271/14; 271/18.1; 271/146; 318/568.21; 318/568.22; 318/568.24; 318/611

(58) Field of Classification Search ................ 700/258, 700/213, 219, 83, 245, 254, 259; 414/796.2, 414/796.5, 796.9, 797, 797.8, 797.9; 271/8, 271/10.14, 18.1, 146, 268, 258.01, 262; 198/468.2, 198/468.4; 318/568.21, 568.22, 568.24, 318/611; 219/85
See application file for complete search history.

(56) References Cited

U.S. PATENT DOCUMENTS 5,089,970 A * 2/1992 Lee et al. ....................... 700/96

(Continued)

FOREIGN PATENT DOCUMENTS

DE          42 22 990 A1    10/1993

(Continued)

OTHER PUBLICATIONS

ARC Advidory Group, SIEMENS, SIG Pack Systems, and Cimetrix Delivering Next Generation Packaging and Assembly•Robotics, 2001, Internet, p. 1-11.*

(Continued)

*Primary Examiner*—Khoi Tran
*Assistant Examiner*—McDieunel Marc
(74) *Attorney, Agent, or Firm*—Alston & Bird LLP

(57) ABSTRACT

A gripping device for a manipulation system, particularly a robot, for receiving workpieces and feeding them from a readied stack of the workpieces to a manufacturing plant such as a metal sheet folding machine, punching press, welding plant, etc. The device has a gripper head fitted with gripping means such as suction cups, magnets, tongs, etc., and a detection system for detecting characteristics of the workpiece gripped by the gripping means. A pulse emitter excites vibrations in the workpiece and the vibration spectrum of the workpiece is compared to reference vibration data to determine characteristics of the gripped workpiece, such as whether two or more workpieces are stuck together, or whether the workpiece is the correct workpiece.

11 Claims, 4 Drawing Sheets

U.S. PATENT DOCUMENTS

| | | | |
|---|---|---|---|
| 5,150,288 A * | 9/1992 | Imai et al. | 700/3 |
| 5,329,597 A * | 7/1994 | Kouno et al. | 382/152 |
| 5,524,131 A * | 6/1996 | Uzawa et al. | 378/34 |
| 5,627,440 A * | 5/1997 | Yamamoto et al. | 318/568.21 |
| 5,799,530 A * | 9/1998 | Nagasawa | 72/389.3 |
| 5,822,207 A * | 10/1998 | Hazama et al. | 700/97 |
| 5,822,389 A * | 10/1998 | Uzawa et al. | 378/34 |
| 5,828,575 A * | 10/1998 | Sakai | 700/182 |
| 5,854,994 A * | 12/1998 | Canada et al. | 702/56 |
| 5,899,341 A | 5/1999 | Irita | |
| 5,969,973 A * | 10/1999 | Bourne et al. | 700/165 |
| 6,067,862 A * | 5/2000 | Murray et al. | 73/862.043 |
| 6,298,977 B1 * | 10/2001 | Rivers, Jr. | 198/468.5 |
| 6,595,052 B2 * | 7/2003 | Wharton | 73/460 |
| 6,826,944 B1 * | 12/2004 | Hagel | 72/405.16 |
| 2002/0008004 A1 * | 1/2002 | Rivers, Jr. | 198/468.5 |

FOREIGN PATENT DOCUMENTS

JP  07053095 A  2/1995

OTHER PUBLICATIONS

International Search Report for PCT/AT2003/00282; Filed Sep. 25, 2003; Date of Completion Mar. 8, 2004; Date of Mailing Mar. 19, 2004.

International Preliminary Examination Report; Date Completed Dec. 3, 2004.

* cited by examiner

GRIPPING DEVICE FOR MANIPULATING DEVICE AND METHOD FOR OPERATION THEREOF

BACKGROUND OF THE INVENTION

The invention relates to a gripping device for a manipulation system comprising a robot for receiving parts and feeding a manufacturing plant with a workpiece from a readied stack of workpieces. The invention also relates to a method for operating the gripping device.

In the manipulation of workpieces with automated manipulation systems, so-called robots, where the workpieces are seized and lifted by means of a gripping device from a made-ready position and then have to be fed to a manufacturing system where they are worked, problems often occur with the feed from a stack of cut or punched flat workpieces such as metal sheets, for example due to surface contamination caused by a film of cutting or punching oil, causing the sheets to adhere to each other, so that two or more sheets are picked up from the stack by the gripping device, for example a suction or magnetic gripper, instead of only one single sheet, leading to interference with the production process.

Possibilities for remedying such a situation are known in the prior art, one such possibility being to equip the gripping device with a weight sensor in order to determine the weight of the seized sheets lifted on the gripping device with the help of the parameters stored in a computer, and to then separate the workpieces, if necessary.

Another possibility offered by the prior art is to carry out an optical measurements, for example of the thickness after the sheet has been seized, and to then determine the number of workpieces seized based on the weight with the help of the parameters stored in a computer, in order to subsequently separate the workpieces, if need be.

Furthermore, ultrasound, eddy current and magnetic measuring methods are known, by which the total weight is determined, and the further course of action is then determined as in connection with an optical measurement.

Moreover, it is known also to divide the workpieces into single pieces before they are seized if such pieces stick together. However, the devices required for such separation require high expenditure in terms of mechanical components, and their operation is connected with increased controlling expenditure.

SUMMARY OF THE DISCLOSURE

Now, the problem of the invention is to offer a gripping device for a manipulation system that permits quick recognition of the number of workpieces picked up by the gripping device, and which can be realized with a low weight and compact design.

The invention addresses this problem by providing a gripping device comprising a gripper head supporting gripping means, and a detection system for detecting a workpiece received by the gripping means, and comprising at least one pulse emitter acting upon the workpiece to excite vibrations in the workpiece, and at least one vibration sensor for sensing the vibrations of the workpiece, and a memory and/or analytical module structured and arranged to conduct a vibration analysis on a vibration signal from said vibration sensor, wherein the detection system and the memory and/or analytical module jointly form a component part detachably arranged on the gripper head and in communication with a controller of the manufacturing plant. The surprising benefit gained with such features is that in addition to the control as to whether the workpiece seized is a single part or a number of parts, a further control possibility is given in that it is possible to determine via the vibration behavior whether the seized workpiece is the correct part, because the vibration is dependent upon both the material and the dimension, so the correct conclusions can be drawn in this way as well. Furthermore, the control is carried out directly on the gripper head, which permits dispensing with additional travel distances of the manipulation system and to save cycle time, and higher productivity of the manufacturing system is achieved.

However, an embodiment in which the pulse emitter is provided with a piezo sensor is feasible as well because the data decisive for a vibration analysis on the seized workpiece are determined directly on the excitation source based on the excitation pulse, which avoids interfering influences and permits using for the analysis a smaller vibration bandwidth for the basic data, which in turn increases the process safety.

In one embodiment, the frequency spectrum of the vibration in the workpiece is evaluated by comparison with stored data directly on the gripper head, so that no large amounts of data required for an analysis will not additionally load the communication system and in particular a bus system available for control measures of the manipulation system and the gripper head.

Connecting the memory and/or analytical module with a controller of the manufacturing plant via a bus system or cable line permits a higher memory and computer capacity.

An embodiment wherein data are wirelessly transmitted between the vibration sensor and/or the memory and/or analytical module and/or the controller is beneficial as well in that it dispenses with electrical line connections.

Furthermore, an embodiment wherein the pulse emitter is formed by a striking tappet acted upon by kinetic energy is advantageous in that it offers an interference-proof excitation source for generating vibration in the workpiece.

By providing the vibration sensor as an acceleration sensor arranged to be placed onto a surface of the workpiece, it is possible to employ a sensor element that has been successfully used for high application frequency.

Another advantageous embodiment has the pulse emitter and the vibration sensor arranged together, which permits the realization of a compact design and where the excitation source and measurement source act via a contact point and the gripper geometry thus has no influence of the result of the analysis.

An efficient communication and energy supply system is obtained by supplying the detection system with power by means of the ASi bus, and/or by transferring data between the detection system and the controller via the ASi bus.

Furthermore, by arranging the pulse emitter and vibration sensor on the gripper head with a spacing between them, and/or by arranging contact points of the pulse emitter and vibration sensor on a surface of the workpiece outside of the surface area of the workpiece defined by the gripping means, any influence of the vibration frequency due to holding forces of the gripping means is avoided.

A further embodiment in which the detection system with the memory and/or analytical module is detachably connected with the gripper head via coupling means is beneficial in that it offers a self-sufficient detector system that can be selectively fitted on gripper heads with different configurations.

BRIEF DESCRIPTION OF THE DRAWINGS

For the sake of better understanding, the invention-s is explained in greater detail in the following with the help of the exemplified embodiments shown in the drawings, in which.

DETAILED DESCRIPTION OF THE DRAWINGS

It is noted here by way of introduction in the different embodiments described in the following, identical components are provided with identical reference number or component designations, whereby the disclosures contained throughout the specification are applicable in the same sense to identical components and identical component designations. Furthermore, positional data selected in the specification such as, for example "top", "Bottom", "laterally" etc. relate to the directly described and shown figure, and have to be applied to the new position where a position has changed. Moreover, individual features and combinations of features in the different exemplified embodiments shown and described herein may represent independent inventive solutions or solutions as defined by the invention.

Figure 1:
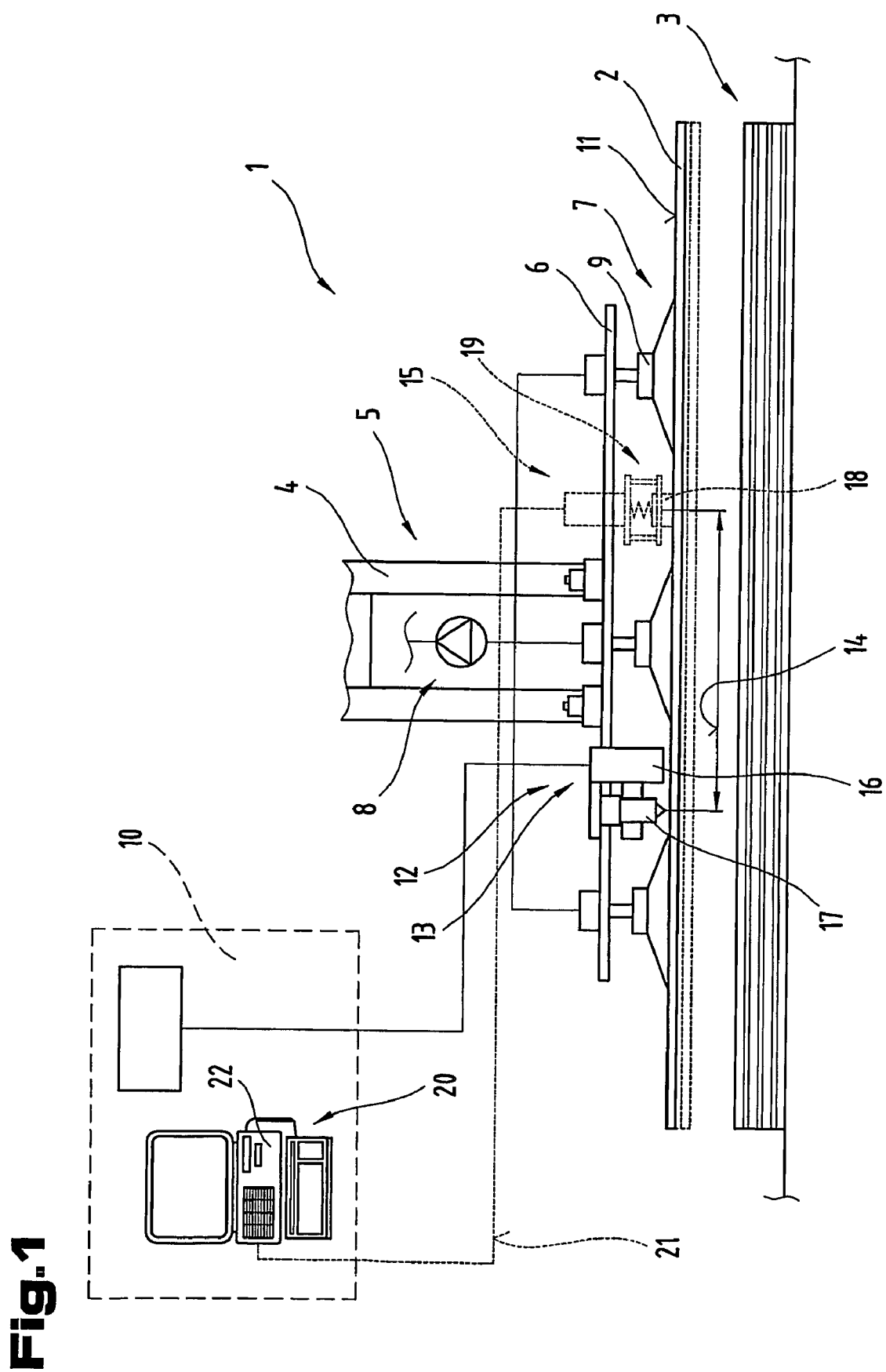
FIG. 1 is a schematic representation of the gripper device as defined by the invention.

FIG. 1 is a schematic representation of a gripping device 1 for receiving the workpieces 2 from a stack 3 of such workpieces, particularly for the metal sheet workpieces 2. As shown, the gripping device 1 is secured on an arm 4 of a manipulation system 4, e.g. a robot not shown in any greater detail. A gripper head 6 is fitted with the gripping means 7, for example with the suction cups 8, which are connected via a cable line with a vacuum generator 8, whereby it is naturally possible also to employ magnets or tongs or the like. For lifting the workpiece 2 from the stack 3, the gripping device is positioned with respect to the stack 3 in a preset gripping position by means of a controlling device 10 of the manipulation system 5, and placed with the suction cups 9 or other gripping means on the surface 11 of the workpiece 2. If suction cups are employed, the workpiece is seized by application of a vacuum in the vacuum generator 8, and lifted from the stack 3 in order to be fed to a manufacturing system by means of the manipulation system 5 for a manufacturing process to be carried out, for example by folding, punching, welding etc.

The problem often occurring in this connection is that due to a film of oil on the surface 11 of the workpieces 2 stored in the stack 3, the workpieces adhere to each other, so that two or more of the workpieces 2 are jointly lifted from the stack as shown in FIG. 1.

For resolving this problem, the gripping device 1 as defined by the invention comprises a detection system 12 consisting of a pulse emitter 13 and a vibration sensor 15 arranged with a spacing 14 from the pulse emitter. In the exemplified example show, the pulse emitter is formed by an impact tappet 17, which is actuated by an electromagnet 16. Said impact tappet is controlled by the controlling device 10 in order to excite by means of an impact pulse a vibration in the workpiece 2. The vibration sensor 15 provided for detecting the vibration is, for example an acceleration sensor 18, which is placed with a preset force onto the workpiece seized by the gripping device 1 by means of a contact-pressure exerting device 19. The acceleration sensor 18 is connected by cable with a memory module and/or analytical module via a bus system 21. In connection with the exemplified example shown, the memory module and/or analytical module is an external computer, which is preferably integrated in the controlling device 10. It is noted that the data transmission naturally may take place wirelessly as well.

However, an embodiment is possible also where the memory and analytical module 20 is directly arranged on the gripper head 6 in order to directly evaluate the data determined by the acceleration sensor 18 on site, so that the bus system 21 is relieved and the data transmitted to the controlling device 10 via the bus system 21 for the evaluation as to whether a single or more of the workpieces 2 have been picked up can be limited to the information pulses "Yes/No".

The process for the recognition as to whether one single or more of the workpieces 2 have been picked up is described in the following.

After the workpiece 2 has been lifted from the stack 3, the pulse emitter 3 is controlled, which, with its striking tappet 17, strikes the surface 11 of the workpiece 2 with a minimum of contact time, and thereby puts the workpiece 2 into vibration. The vibration spectrum is recorded by means of the acceleration sensor 18 and processed in the memory and/or analytical module 20 by means of Fourier transformation, and compared with a vibration spectrum stored for the workpiece 2 in the memory and/or analytical module 20. This reference curve of the vibration curve is determined on a workpiece in an acquisition process, or determined for a preset number of workpieces 2 in a so-called teach-in process carried out in front-end equipment, and the data of the reference curves are stored in the memory and/or analytical module 20. There is no need for explaining in greater detail that the vibration behavior of the workpiece 2 is influenced by the material, the dimensions and the gripping position of the gripping means, and quite significantly, of course, whether only one single workpiece 2 or several of such workpieces have been seized by the gripping device 1.

It is naturally possible to store in the memory and/or analytical module 20 the processed data of the respective vibration spectrum for different workpieces in a workpiece matrix depending on the memory capacity, and to call in such data prior to the processing of the respective workpiece 2 via a code, and to then access such data for the analysis. This permit quick retooling of a manufacturing plant and thus increases its capacity and the economy of such a production facility.

Figure 2:
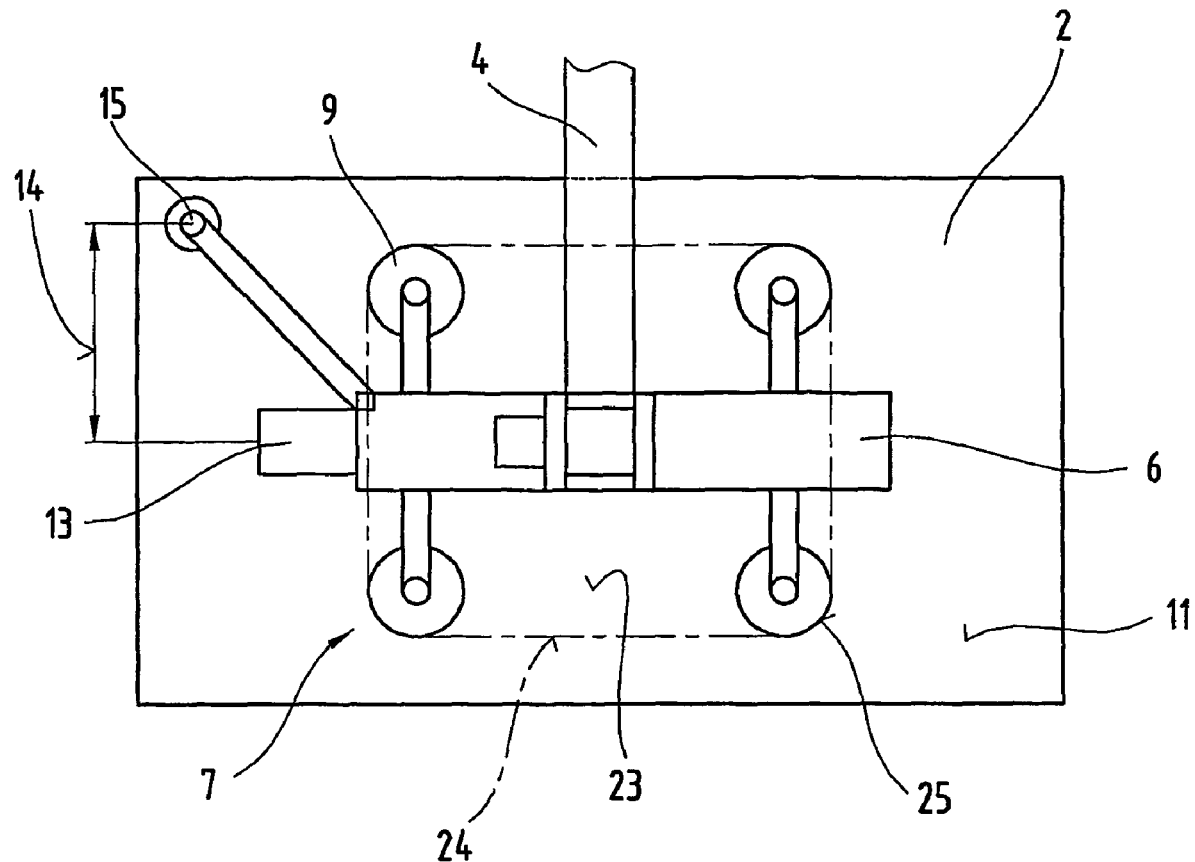
FIG. 2 is a possible arrangement on a gripper head.

Now, FIG. 2 shows by a simplified representation a, for example rectangular precut of the workpiece 2, the gripping means 7, the pulse emitter 13 and the vibration sensor 15 on the gripper head 6. The pulse emitter 13 and the vibration sensor 15 are arranged with the largest possible spacing from each other for a safe analytical result. Furthermore, said components should be placed onto the workpiece 2 in a surface area 23 of the surface 11 that is located as far outside of the area defined by the gripping means 7 as possible that would have a damping effect on the propagation of the vibration. In particular, an imagined line of connection 24 between the pulse emitter 13 and the vibration sensor 15 should not extend through or between the contact points 25 of the gripping means 7.

Furthermore, it is of decisive importance that a pulse emitted by the pulse emitter 13 onto the workpiece 2 impacts the latter within a contact time of about 200 ms in order to prevent any damping effect. Moreover, the pulse sensor 15 should be placed by the contact pressure-exerting device 19 (described in connection with FIG. 1) against the surface 11 with a uniform contact pressure that is not be influenced by the vibrations. The gripping range as defined, for example by the contact points 25 of the gripping means 7, has to be positioned within narrow tolerances with respect to the references formed by the edges of the work-piece, whereby such a requirement is to be met in any case also in view of the positioning accuracy for subsequent processing operations, and is achieved also with the manipulation systems currently in use. Furthermore, it is pointed out herewith that according to an advantageous embodiment, the detection system 12 (see FIG. 1) and the pulse emitter 13, the vibration sensor 15 and the memory and/or analytical module 20 (see FIG. 1) preferably jointly form one component part, which is detachably arranged on the gripper head 6 and therefore exchangeable, and in contact via the bus system with other components such as, for example sensors, an optical positioning system etc. for supplying such components arranged on the gripper head 6 with energy and for the purpose of transmitting data.

Figure 3:
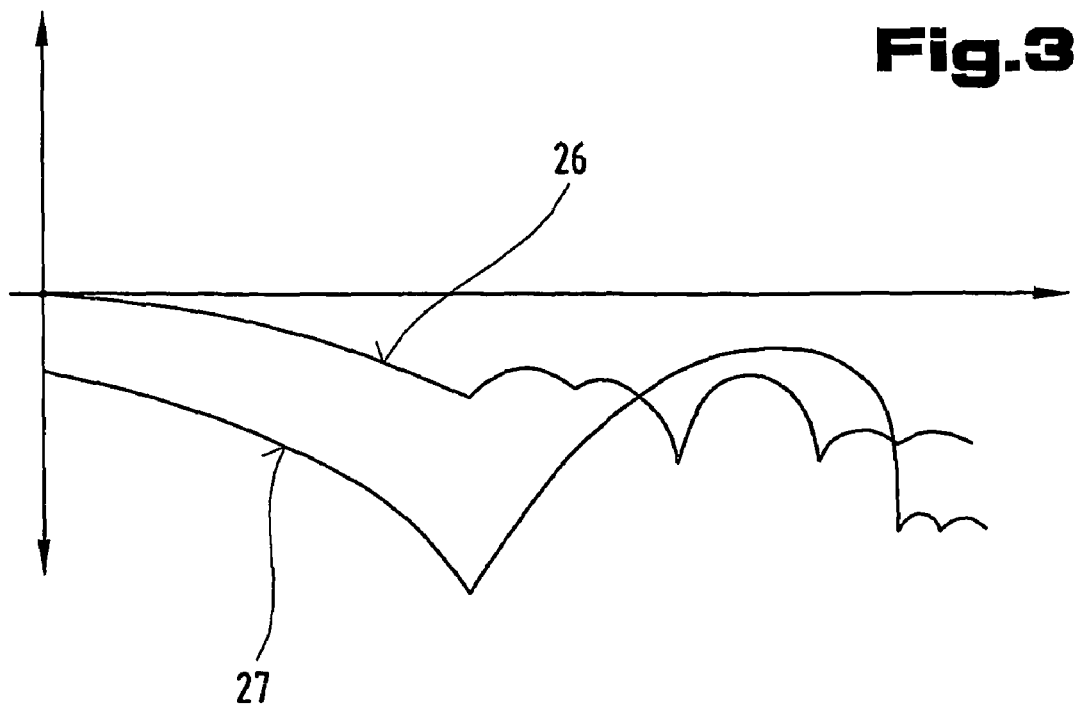
FIG. 3 is a vibration pulse diagram.

Now, the diagram of FIG. 3 shows by a simplified form of curves the signal energy of the vibration sensor from the time of vibration excitation until the vibration fades out. Said signal energy serves as the basic quantity in the stored evaluation algorithm in the memory and/or analytical module 20. Now, the differences between the curves of the signal energy are shown with the help of two curves determined in practical tests, whereby the curve line 26 reflects the signal energy at the vibration of one single workpiece seized by the gripping device 1, and the curve line 27 the signal energy at the vibration of two workpieces 2 sticking together. It was possible to determine with the help of measurement series that said curves move within a narrow bandwidth range, and that because of the significant differences between the curves, a clear evaluation is achieved even when taking into account factors that cannot be influenced.

The diagram shows that a clear distinction is possible, and that suitable measures can be implemented such as the separation of workpieces adhering to each other. Such measures can be carried out without time delay directly after the vibration has been evaluated.

Figure 4:
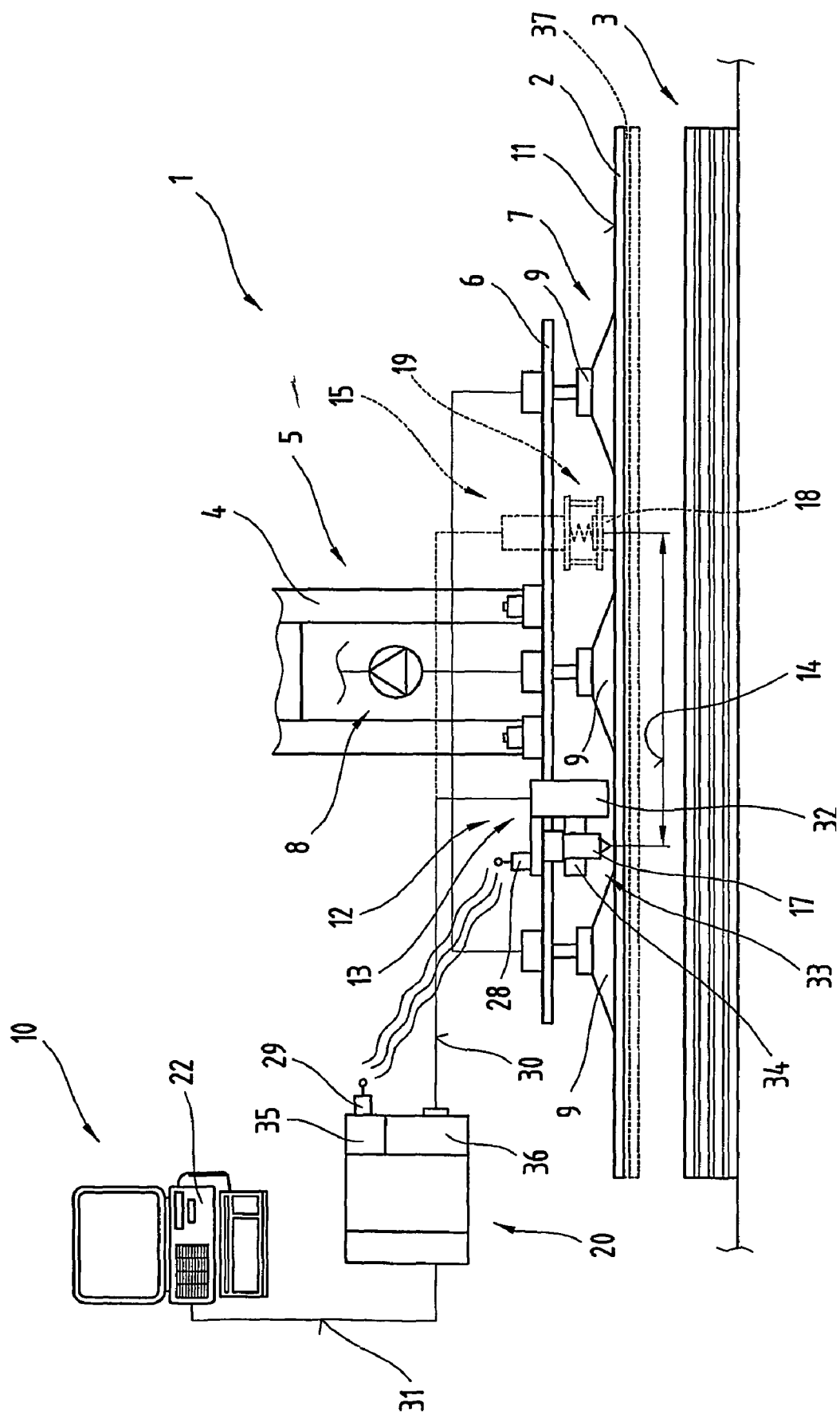
FIG. 4 is another embodiment of the gripping device as defined by the invention.

FIG. 4 shows a schematic representation of another embodiment of the gripping device 1. In such an embodiment of the gripping device 1, the gripper head 6 has the gripping means 7, for example in the form of the suction cups 9. The gripper head 6 is secured on the arm 4 of the manipulation system 5 not shown in detail. Furthermore, the pulse emitter 13 is arranged on the gripper head 6 and connected for wireless communication, for example via a transmitting and receiving module 28 with another transmitting and receiving module 29 of the memory and/or analytical module 20. For supplying the pulse emitter 13 with energy, the latter is connected with the bus system 21 via a cable line 30. The memory and/or analytical module 20 is also in communication with the controlling device 10 via a cable line 31, or wirelessly connected to said controller 10.

The pulse emitter 13 has an impact tappet 17 that strikes the workpiece 2 seized by the gripping device 1 with a preset striking pulse with a preset energy. Furthermore, the vibration exciter 13 is provided sensor element 33, for example a piezo sensor 34. Said sensor element 33 serves for determining the acceleration of the striking tappet 17 for impacting the workpiece 2 and for determining the delay after the pulse has been applied.

The acceleration and delay data so determined are evaluated in a computer module 35 of the memory and/or analytical module 20, particularly a μ-controller; the determined acceleration and delay data are compared with reference data stored in a memory module 36, and following such comparison, it is possible to determine whether the gripping device 1 has picked up one single workpiece 2 or two or more workpieces 2 adhering to each other via an oil film 30 or a cutting burr etc., because a proportional or relative number formed based on the acceleration and delay of the striking tappet 17 is forming a clear analytical result.

In order to further refine the analytical results, it is possible, furthermore, to additionally equip the gripper head 6 equipped with the sensor element 33 as shown by dashed lines with the vibration sensor 15 described already above. For the evaluation as to whether only one single workpiece 2 or several of such workpieces have been picked up, both the result of the pulse analysis and the result of the vibration analysis are used in order to achieve high analytical safety.

Figure 5:
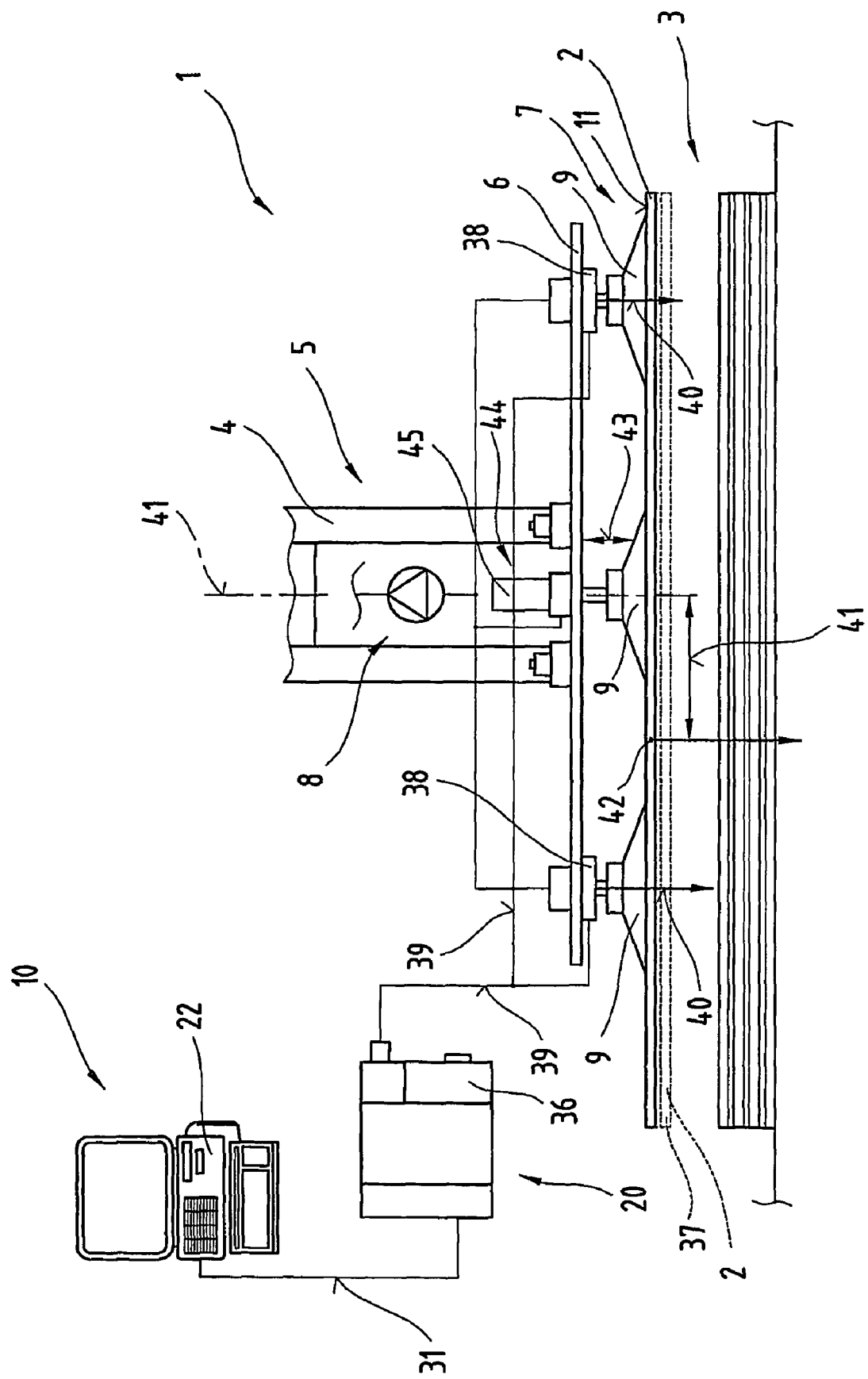
FIG. 5 is another design of the gripping device as defined by the invention.

FIG. 5 shows another embodiment of the gripping device 1 as defined by the invention. In the present embodiment, the gripper head 6 is fitted with the suction cups 9, to which a vacuum is admitted for receiving a workpiece 2, such suction cups forming the gripping means 7 in the present embodiment. By means of the arm 4 of the manipulation system 5, the suction cups 9 are placed on the surface 11 of the workpiece 2 readied on the stack 3, and the latter is lifted from the stack 3 by applying the vacuum. At least one of the gripping means 7, in the concrete exemplified embodiment two of such means are supported on the gripper head 6 via the pressure sensors 38 for determining the force (pressure or tensile force) caused by the weight of the workpiece 2.

As the workpiece 2 is being lifted from the stack 3, values measured for the force are recorded by the pressure sensors 38 and transmitted via the measurement lines 39 to the memory and/or analytical module 20, and compared with stored weight data of the work-piece intended for further processing. It is possible to determine in this way whether the gripping device 1 picked up one single workpiece 2 or two or more workpieces 2 as shown by dashed lines, such workpieces sticking together due to, for example an oil film 37.

Furthermore, by comparing the data measured and supplied by the pressure sensors 38 as a result of the pressure forces occurring due to the weight of the workpiece 2 as indicated by the arrow 40 of at least two gripping means 7 acting on the workpiece 2, it is possible to determine whether the latter was gripped in the correct position in relation to a reference position. This is achieved via the position determined according to the force components or via a spacing 42 of the workpiece 2 with respect to the reference position.

As already described above, the memory and/or analytical module 20 is naturally connected via the cable line 31 with the controlling device 10 and the computer 22, and comprises the memory module 36. However, as stated above, wireless communication is possible as well.

FIG. 5 shows, furthermore, that the separation of a number of workpieces 2 adhering to each other is possible by arranging a gripping means 7 that is adjustable in the direction indicated by the double arrow 43, i.e. perpendicularly to the surface 11 of the workpiece 2. For this purpose, a center gripping means 7, for example, is supported on the gripper head 6 and adjustable by means of a servo-drive 44, for example a pressure cylinder, to which a medium can be admitted. Such an arrangement permits reshaping the workpieces 2 from a stretched into a curved position, whereby the adhering workpiece 2 is not completely joining in such reshaping and a fan-like separation will occur in the marginal areas, and the adhering workpiece will finally detach itself due to the reduction in the auction effect as air enters into the interface area between the two workpieces.

In the interest of good order, it is finally noted that for the sake of better understanding of the structure of the gripping device, the latter or its components are partly shown untrue to scale and/or enlarged and/or reduced.

Furthermore, it is noted that the individual embodiments shown in FIGS. 1, 2, 3; 4; 5 form the object of independent solutions as defined by the invention. The relevant problems and solutions as defined by the invention are specified in the detailed descriptions of said figures.

The invention claimed is:

1. A gripping device for a manipulation system comprising a robot for receiving parts and feeding a manufacturing plant with a workpiece from a readied stack of workpieces, the gripping device comprising a gripper head supporting gripping means, and a detection system for detecting a workpiece received by the gripping means, and comprising at least one pulse emitter acting upon the workpiece to excite vibrations in the workpiece, and at least one vibration sensor for sensing the vibrations of the workpiece, and a memory and/or analytical module structured and arranged to conduct a vibration analysis on a vibration signal from said vibration sensor, wherein the detection system and the memory and/or analytical module jointly form a component part detachably arranged on the gripper head and in communication with a controller of the manufacturing plant via a bus system comprising an ASi bus.

2. The gripping device according to claim 1, wherein the pulse emitter has an impact tappet that strikes the workpiece seized by the gripping device with a preset striking pulse with a preset energy and the pulse emitter is provided with a piezo sensor for determining the acceleration of the impact tappet impacting the workpiece and for determining the delay after the pulse has been applied.

3. The gripping device according to claim 1, wherein data are wirelessly transmitted between the vibration sensor and/or the memory and/or analytical module and/or the controller.

4. The gripping device according to claim 1, wherein the pulse emitter is formed by a striking tappet acted upon by kinetic energy.

5. The gripping device according to claim 1, wherein the vibration sensor is formed by an acceleration sensor arranged to be placed onto a surface of the workpiece.

6. The gripping device according to claim 5, wherein the acceleration sensor is supported on the gripper head via a contact-pressure-exerting device.

7. The gripping device according to claim 1, wherein the pulse emitter is provided with the vibration sensor.

8. A method for feeding workpieces from a stack of workpieces to a metal sheet folding machine for reshaping the workpieces by folding with a manipulation system, comprising the steps of:
 gripping a workpiece at a top of the stack of workpieces using a gripping device;
 lifting the gripped workpiece up from the stack with the gripping device;
 exciting vibrations in the lifted workpiece using a pulse emitter arranged on the gripping device and acted upon by a controller;
 sensing the vibrations in the workpiece using a vibration sensor arranged on the gripping device;
 recording signals from the vibration sensor in a memory and/or analytical module; and
 comparing a vibration spectrum of the workpiece stored in said module with reference vibration data;
 wherein the vibration sensor is applied to a surface of the workpiece by a contact pressure-exerting device, whereupon a pulse is applied to the workpiece by the pulse emitter with a contact time of about 200 ms for exciting vibrations.

9. The method of claim 8, wherein the comparing step comprises comparing the vibration spectrum with reference data so as to determine whether one or more additional workpieces is/are stuck to the workpiece gripped by the gripping device.

10. The gripping device according to claim 1, wherein the memory and/or analytical module is structured and arranged to record signals from the vibration sensor, and to compare a vibration spectrum of the workpiece with reference vibration data so as to determine whether one or more additional workpieces is/are stuck to the workpiece gripped by the gripping device.

11. The gripping device according to claim 1, wherein the memory and/or analytical module is structured and arranged to record signals from the vibration sensor, and to compare a vibration spectrum of the workpiece with reference vibration data so as to determine via the vibration spectrum whether the seized workpiece is the correct part.

* * * * *